United States Patent
Birk et al.

(10) Patent No.: US 11,470,957 B2
(45) Date of Patent: Oct. 18, 2022

(54) CELL OF A BRUSH MAKING DEVICE

(71) Applicant: The Procter & Gamble Company, Cincinnati, OH (US)

(72) Inventors: Andreas Birk, Kronberg (DE); Holger Port, Schwalbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 146 days.

(21) Appl. No.: 16/997,566

(22) Filed: Aug. 19, 2020

(65) Prior Publication Data

US 2021/0052063 A1  Feb. 25, 2021

(30) Foreign Application Priority Data

Aug. 19, 2019 (EP) .................................. 19192276

(51) Int. Cl.
*A46D 3/00* (2006.01)
*A46D 3/08* (2006.01)
*A46D 3/04* (2006.01)
*B29C 45/26* (2006.01)
*B29L 31/42* (2006.01)

(52) U.S. Cl.
CPC ............... *A46D 3/005* (2013.01); *A46D 3/04* (2013.01); *A46D 3/08* (2013.01); *B29C 45/2628* (2013.01); *B29L 2031/425* (2013.01)

(58) Field of Classification Search
CPC .. A46D 3/005; A46D 3/04; A46D 3/08; B29L 2031/425
See application file for complete search history.

(56) References Cited

U.S. PATENT DOCUMENTS

| | | |
|---|---|---|
| 4,802,255 A | 2/1989 | Breuer |
| 5,268,005 A | 12/1993 | Suhonen |
| 5,313,909 A | 5/1994 | Tseng |
| 8,448,286 B2 | 5/2013 | Driesen et al. |

(Continued)

FOREIGN PATENT DOCUMENTS

| | | |
|---|---|---|
| DE | 1209276 B | 1/1966 |
| JP | 0361516 A | 3/1991 |

(Continued)

OTHER PUBLICATIONS

European Search Report dated Oct. 11, 2019, 9 pages.
(Continued)

*Primary Examiner* — Randall E Chin
(74) *Attorney, Agent, or Firm* — Vladimir Vitenberg

(57) ABSTRACT

A cell of a brush making device for making at least a part of a toothbrush, having a pin unit having at least one pin, a pin holding sub-unit and a pin guiding sub-unit, the pin having a first section having a first end and a second section having a second end, the first section having a holding structure, and at least one spring section arranged between the first section and the second section, the pin holding sub-unit having a holding structure that is engaged with the holding structure of the pin for fixedly holding the pin, the pin holding sub-unit and the pin guiding sub-unit being arranged for being movable along a first direction towards and away from each other, and the pin guiding sub-unit having a channel for guiding at least a portion of the second section of the pin, the channel being inclined against the first direction.

19 Claims, 6 Drawing Sheets

(56) References Cited

U.S. PATENT DOCUMENTS

| | | | |
|---|---|---|---|
| 2003/0044604 A1 | 3/2003 | Weihrauch | |
| 2010/0293734 A1 | 11/2010 | Driesen | |
| 2014/0339395 A1* | 11/2014 | Kumpf | B29C 33/38 249/177 |
| 2015/0130259 A1* | 5/2015 | Birk | A46D 1/08 300/19 |
| 2016/0015163 A1 | 1/2016 | Newman | |
| 2019/0014898 A1 | 1/2019 | Newman | |
| 2020/0383466 A1 | 12/2020 | Eben | |
| 2020/0383467 A1 | 12/2020 | Eben | |

FOREIGN PATENT DOCUMENTS

| | | |
|---|---|---|
| JP | 09174570 A | 7/1997 |
| JP | 2001178542 A | 7/2001 |
| JP | 2005103184 A | 4/2005 |
| WO | 2011052274 A1 | 5/2011 |
| WO | 2017179812 A1 | 10/2017 |

OTHER PUBLICATIONS

All Office Actions, U.S. Appl. No. 16/887,958.
All Office Actions, U.S. Appl. No. 16/888,091.
PCT Search Report and Written Opinion for PCT/US2020/070419 dated Dec. 9, 2020.

* cited by examiner

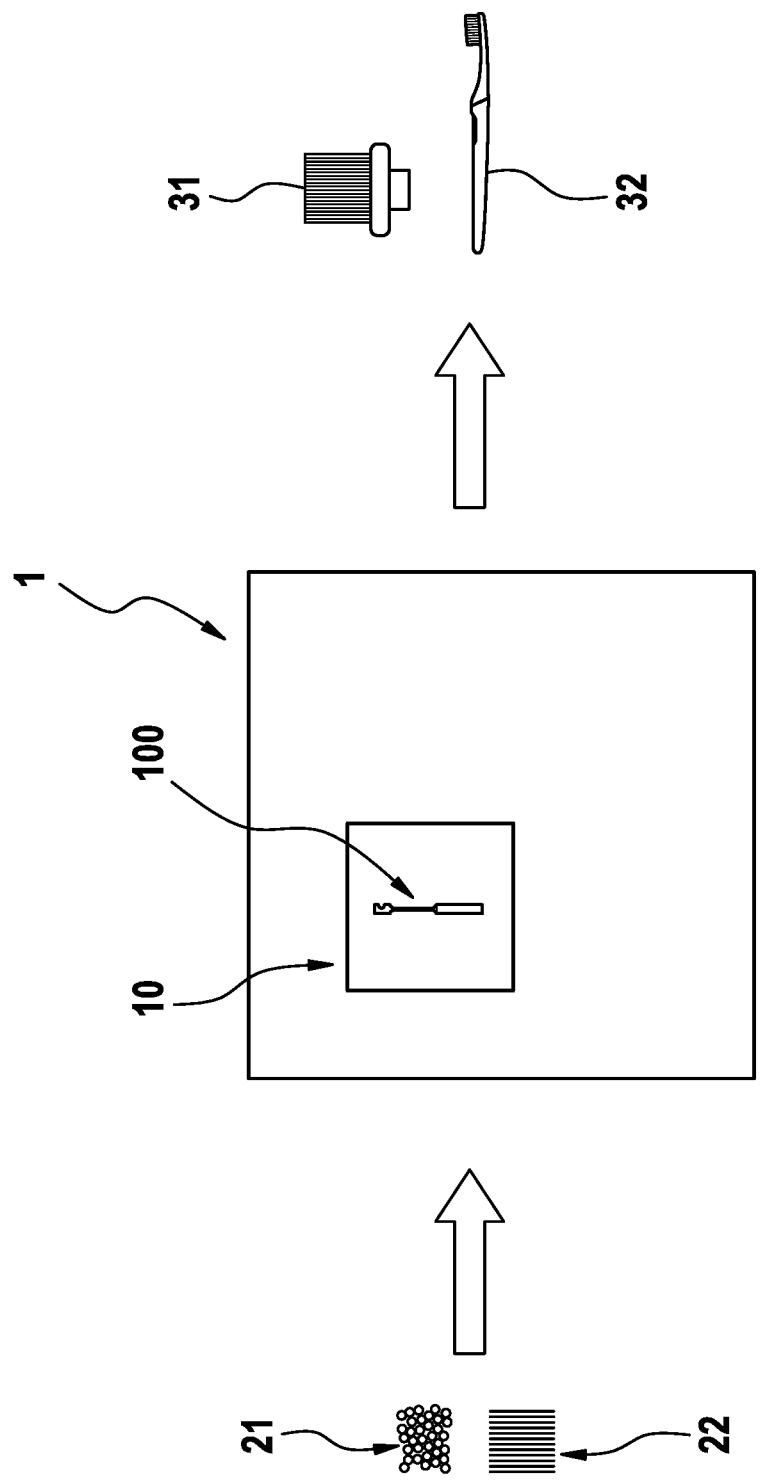

CELL OF A BRUSH MAKING DEVICE

FIELD OF THE INVENTION

The present disclosure is concerned with a cell of a brush making machine and in particular with a pin suitable for a cell of a brush making device.

BACKGROUND OF THE INVENTION

It is generally known that the performance of brushes can benefit from inclined cleaning elements such as filament tufts. Two examples of brushes with inclined filament tufts are the Oral-B® Cross Action replaceable toothbrush head for electric toothbrushes and the Oral-B® Pro-Expert Extra Clean manual toothbrush. The manufacturing of these brushes on the one hand poses some difficulties and on the other hand limits the possible designs.

It is thus an object of the present invention to improve a cell of a brush making device and hence a brush making device so that brushes with inclined cleaning elements can be made with less engineering burden and/or with a higher degree of design freedom.

SUMMARY OF THE INVENTION

In accordance with an aspect of the present disclosure, a cell of a brush making device for making at least a part of a brush, in particular a part of a toothbrush, is provided, the cell having a pin unit having at least one pin, a pin holding sub-unit and a pin guiding sub-unit, the pin having a first section having a first end and a second section having a second end, the first section having a holding structure, and at least one spring section arranged between the first section and the second section, the pin holding sub-unit having a holding structure that is engaged with the holding structure of the pin for fixedly holding the pin, the pin holding sub-unit and the pin guiding sub-unit being arranged for being movable along a first direction towards and away from each other, and the pin guiding sub-unit having a channel for guiding at least a portion of the second section of the pin, the channel being inclined against the first direction.

In accordance with an aspect of the present disclosure, a brush making device is provided that comprises a cell as discussed herein.

In accordance with an aspect of the present disclosure, a pin for a cell of a brush making device is provided, the pin comprising a first section having a first end and a holding structure, a second section having a second end, and at least one spring section extending between the first section and the second section, the spring section having a cross-sectional area smaller than a cross-sectional area in the first section excluding the holding structure and having a cross-sectional area smaller than a cross-sectional area in the second section.

BRIEF DESCRIPTION OF THE DRAWINGS

The present disclosure will be further elucidated by a detailed description of example embodiments of a cell of a brush making device and a pin for use in such a device. In the description, reference is made to figures, where in the figures

FIG. 5 is a schematic depiction of a brush making device comprising a cell as discussed herein, in which cell a pin as discussed herein is used.

DETAILED DESCRIPTION OF THE INVENTION

Figure 1A:
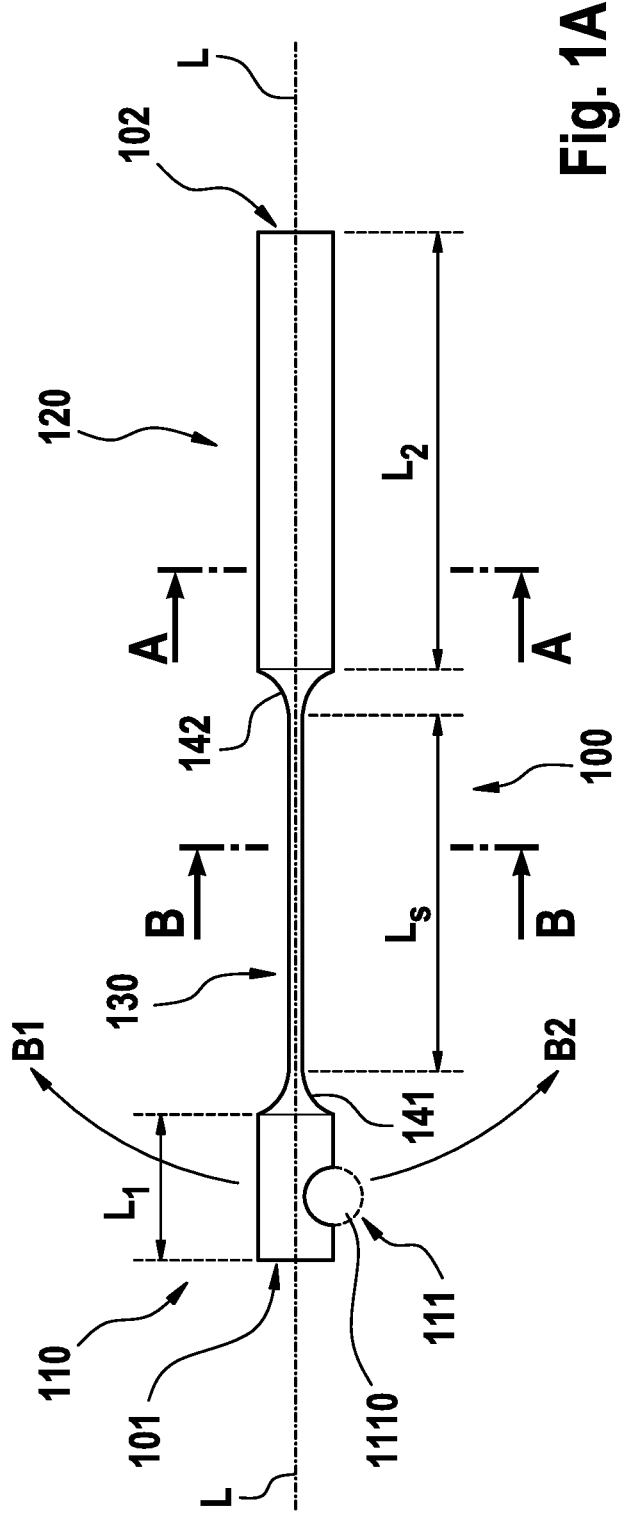
FIG. 1A is a schematic depiction of an example embodiment of a pin for being used in a cell of a brush making device as discussed herein.

It is basically known that the cleaning performance of brush heads such as toothbrush heads benefits from cleaning elements, in particular filaments tufts, that are inclined with respect to a mounting surface of a brush carrier. Inclined tufts may better reach into hard to clean areas. In order to make such a brush head, filament tufts need to be provided that are inclined with respect to a standard direction (i.e. normal to the mounting surface) or tufting holes need to be provided in a brush carrier, into which inclined tufting holes cleaning elements such as filament tufts can be mounted, e.g. by means of the known anchor tufting technology. The present disclosure is concerned with a cell for a brush making device that comprises an improved structure so that inclined cleaning elements can be made with greater manufacturing ease than is possible with current technologies. As one core element of such a cell is a pin unit comprising at least one pin that has a particular structure that allows bending of the pin, specifically the pin as proposed has at least one spring section.

Such a pin in accordance with the present disclosure comprises a first section having a first end of the pin, a second section comprising a second end of the pin, and at least one spring section that extends between the first section and the second section. A pin in accordance with the present disclosure may have two or more spring sections that are successively provided in the longitudinal extension direction of the pin.

In accordance with the present disclosure, a "spring section" of a pin is a section of reduced bending stiffness in at least one direction or at least two opposing directions, which reduced bending stiffness may essentially be achieved by a change in geometry between the first section and the spring section and between the spring section and the second section. This shall not exclude that the spring section is realized by a more elastic material of the spring section versus the first and second sections. The material chosen for the pin may support the spring behavior of the pin. An elastic material, e.g. a spring metal such as spring steel may be chosen as pin material so that the pin always moves back into its rest position once deflected, when the force causing the deflection vanishes. In some embodiments, the first and second sections are made from a first material (e.g. brass or iron) and the spring section is realized as a leaf spring, which may be welded into slits provided at the first and second sections or may be otherwise connected there, e.g. by riveting or screwing.

The cross-sectional shape and the cross-sectional area of the spring section may be constant and may deviate from the cross-sectional shapes and cross-sectional areas of the first section and of the second section. The cross-sectional shape and the cross-sectional area of the first section and of the second section, respectively, may be constant as well. The cross-sectional-shape of the first section and of the second section may be circular. The cross-sectional shape in the spring section may be essentially rectangular. The small side of the rectangle may be smaller than the long side of the rectangle by at least a factor 2, at least a factor 3, at least a factor 4, at least a factor 5, at least a factor 6, at least a factor 8, at least a factor 10, at least a factor 12, at least a factor 15, at least a factor 20 etc. The ratio between long side length and small side length may lie in the range of between 1.2 and 100. In other embodiments, the cross-sectional shape of the spring section is circular or oval or elliptical and the diameter of the circle or the small axis of the oval or ellipse may be smaller than a diameter of the cross-section of the first and/or second sections by at least a factor 2, at least a factor 3, at least a factor 4, at least a factor 5, at least a factor 6, at least a factor 8, at least a factor 10, at least a factor 12, at least a factor 15, at least a factor 20 etc.

The pin unit may comprise a pin holding sub-unit and a pin-guiding sub-unit. The at least one pin may comprise a holding structure at the first section for engagement with a holding structure at the pin holding sub-unit. The pin guiding sub-unit may comprise a channel in which the second section of the pin can move. The pin holding sub-unit and the pin guiding sub-unit may be arranged for relative movement towards and away from each other along a first direction. The movement of the pin holding sub-unit and of the pin guiding sub-unit may comprise two extreme position into which the sub-units can be moved, where a first extreme position may be the position at which the sub-units have the largest distance to each other and a second extreme position may be the position at which the sub-units are closest to each other. The at least one pin has then two extreme positions as well. In the first extreme position, the pin may be in a retracted position, i.e. a second end of the second section of the pin may be flush with an outer surface of the pin-guiding sub-unit or may be retracted in the channel in which it can move. In the second extreme position the pin may be in an extended position in which the second section of the pin at least partially extends beyond the outer surface of the pin guiding sub-unit. The channel provided in the pin guiding sub-unit may be inclined against the first direction. In case of two or more pins, the channels for the two or more pins may each have a different inclination against the first direction. The spring section of the at least one pin may be bent into a first bending position when the pin is in the first extreme position and may be bent into a second bending direction when the pin is in the second extreme position. The pin may then be in an unbent stage somewhere between the first extreme and the second extreme position, e.g. the pin may be in an unbent stage when it is about halfway between the first extreme and the second extreme positions.

The pin may have at least on a part of its outer surface (e.g. on the outer lateral surface in the second section) a coating to reduce the friction between the pin and the channel in the pin-guiding sub-unit, e.g. a coating of diamond-like carbon (DLC). Additionally or alternatively, the inner walls of the channel may have such a friction-reducing coating.

A cell for a brush making device comprising a pin unit as proposed herein may be arranged for in particular two different purposes:

In accordance with a first purpose, the at least pin is moved from its retracted position into its extended position, where the second section of the pin extends at least partially into a mold cavity to, e.g., define a blind hole in the part to be molded in the mold cavity.

In accordance with a second purpose, the pin is moved from its retracted position into its extended position, where the second section of the pin extends at least partially into a cleaning element holding plate so that the pin can move a cleaning element from the channel in the cleaning element holding plate into a receiving channel or the like.

FIG. 1A is a depiction of an example embodiment of a pin 100 extending along a center axis L, which pin can be used in a cell of a brush making device as will be discussed in more detail further below. The pin 100 comprises a first section 110 having a first end 101 and a holding structure 111, a second section 120 having a second end 102 and a spring section 130 extending between the first section 110 and the second section 120. The first section 110 has an extension length $L_1$, the second section 120 has an extension length $L_2$ and the spring section 130 has an extension length $L_s$. As will be explained, the spring section 130 has here a different cross-sectional shape and different cross-sectional area than the first and second sections 110 and 120. Due to the spring section 130, the first section 110 can bend away relative to the second section 120 in a first bending section B1 and in a second bending section B2. Here, bending away includes a parallel dislocation of one section relative to the other section, which results in a bending of the spring section where the bending curvature along the longitudinal extension of the spring section changes from positive to negative or from negative to positive. It is understood that for manufacturing reasons but also for reasons of mechanical integrity transition sections 141 and 142 are extending between the first section 110 and the spring section 130 and between the second section 120 and the spring section 130. In the following, it is referring to a constant cross-sectional shape and/or cross-sectional area in the different sections 110, 120, 130. It shall be understood that the transition sections 141, 142 are ignored in this respect. The spring section 130 may in some embodiments be made by milling away material of an intermediate pin having a constant cross-sectional shape and constant cross-sectional area.

In the shown embodiment, the first section 110 comprises a holding structure 111, which is realized as a cylindrical cut-out from the first section 110. Such a cut-out can be realized without too much effort, e.g. by milling using a rotational cutter. This shall not exclude that other holding structures may be realized at the first section 110, e.g. projections. In some embodiments, a transverse extending pin 1110 may be disposed in the holding structure 111 as indicated by a dashed line so that the transverse pin 1110 extends on both sides beyond the diameter of the pin 100 and may be secured there, e.g., by gluing or welding—the transverse pin 1110 may then be considered as the holding structure 111. The latter shall not exclude that the transverse pin 1110 is just held in the holding structure 111 by means of a positive fit, which avoids any step of securing these two elements to each other.

The pin 100 may be made from metal such as spring metal, e.g. spring steel such as X10CrNi18-8 1.4310 in accordance with DIN EN 10151.

Figure 1B:
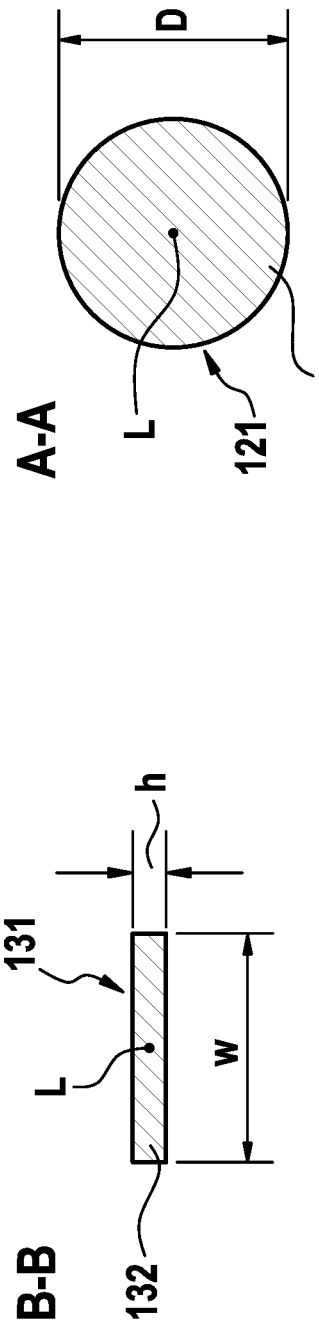
FIG. 1B shows a cross-section of the pin shown in FIG. 1A in its second section.

FIG. 1B shows the cross-sectional shape 121 and cross-sectional area 122 of the second section 120 taken along plane A-A as indicated in FIG. 1A. The cross-sectional shape 121 is here circular and the circular shape has a diameter D. The second section 120 may have a constant cross-sectional shape and cross-sectional area along its extension length $L_2$.

Figure 1C:
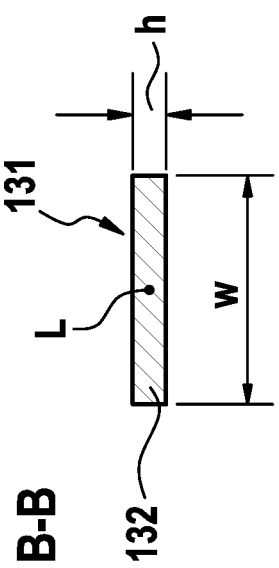
FIG. 1C shows a cross-section of the pin shown in FIG. 1A in its spring section.

FIG. 1C shows the cross-sectional shape 131 and cross-sectional area 132 of the spring section 130 taken along plane B-B as indicated in FIG. 1A. The cross-sectional shape 131 is here essentially rectangular (the small sides may still have a curvature in accordance with the circular cross-section 121 of the second section 120). The rectangle is defined by a short side having a length h and a long side having a length w. In some embodiments, the ratio between the long side length w and the short side length h is at least 2, at least 3, at least 4, at least 5, at least 6, at least 7, at least 8, at least 9, at least 10 etc. In other embodiments not shown here, the spring section has also a circular cross-sectional shape or a quadratic cross-sectional shape that allows the bending away of the first section 110 relative to the second section 120 (which requires that the diameter of the circular cross-sectional shape or the side dimension of the quadratic cross-sectional shape is smaller than the diameter of the cross-sectional shape of the second section 120 (and of the first section 110)). But for the further discussion it is sufficient to have two defined bending directions B1 and B2. The pin can essentially not bend in a direction perpendicular to the bending directions B1 and B2 as the width w of the long side of the rectangular cross-sectional shape 131 may be essentially identical with the diameter D of the circular cross-sectional shape 121 of the second section 120. The spring section 130 also allows a torsional twisting of the first section 110 relative to the second section 120 around the longitudinal axis L. The width w of the rectangular cross-sectional area 132 may in some embodiments be smaller than the diameter D of the circular cross-sectional area 122. This shall not exclude that the width w is in some embodiments larger than the diameter D.

Figure 2A:
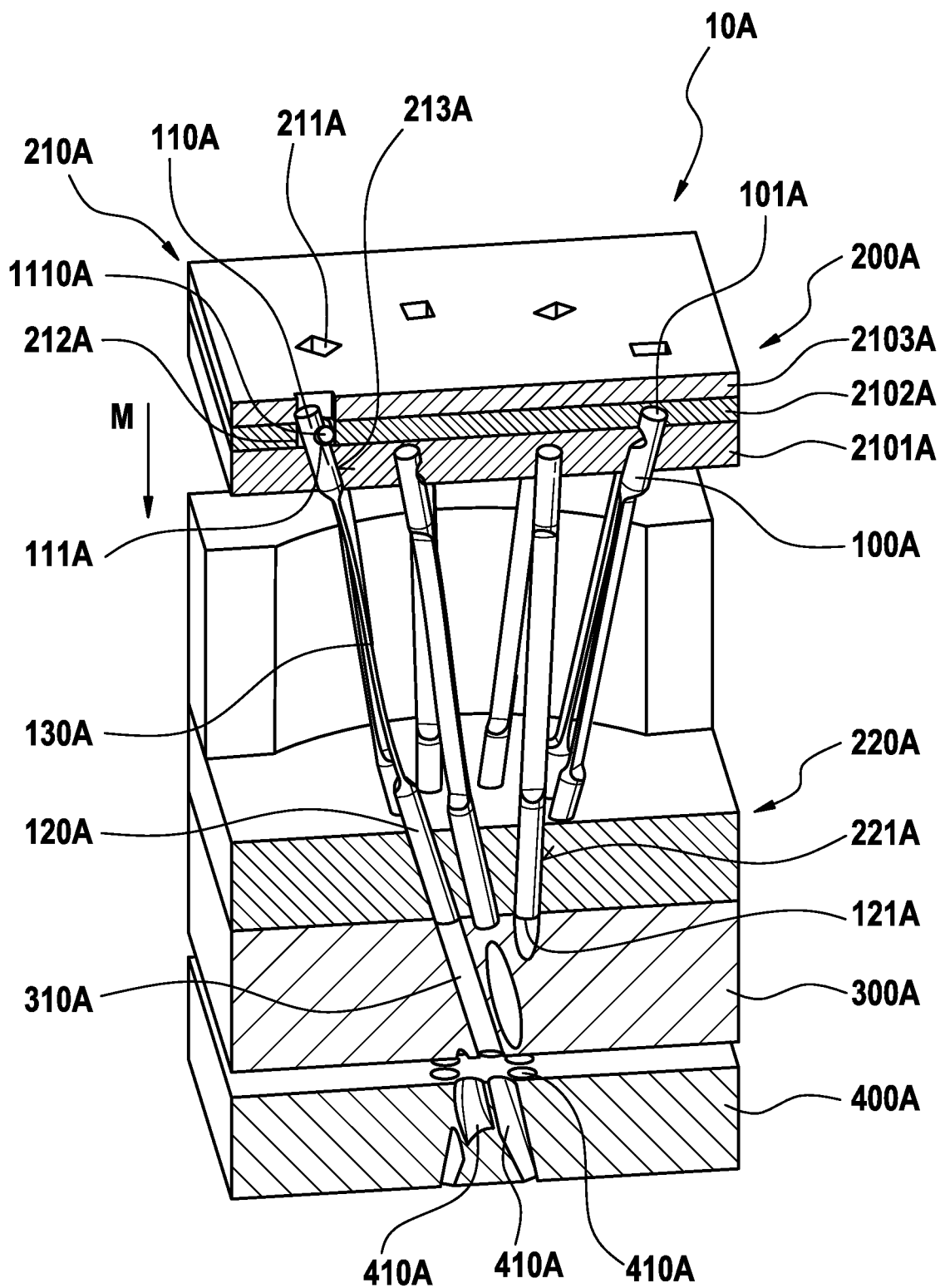
FIG. 2A is a cross-sectional depiction of a part of a cell of a brush-making device, where a plurality of pins are in a retracted position.
Figure 2B:
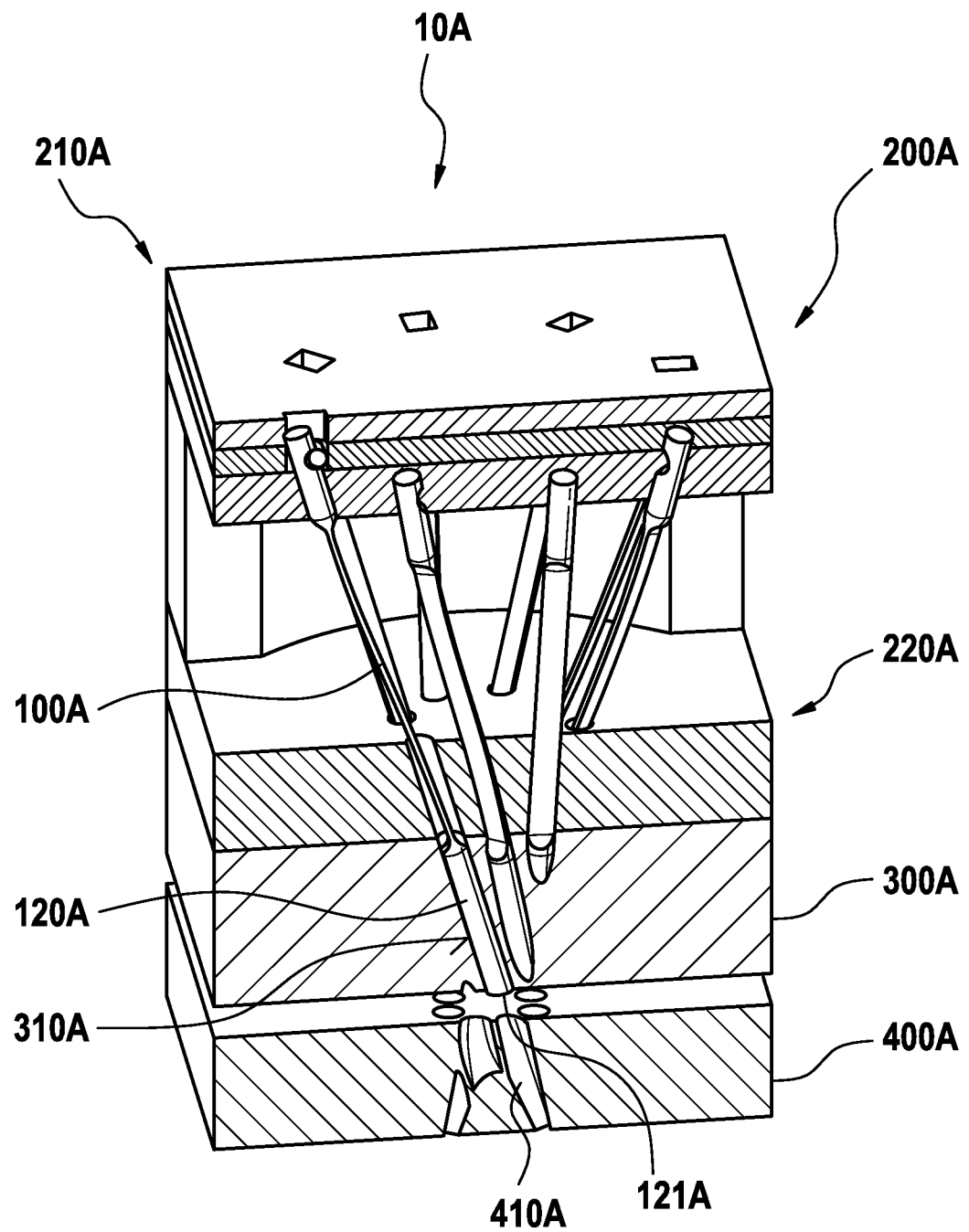
FIG. 2B is a cross-sectional depiction of the part of a cell of a brush making device shown in FIG. 2A, where a pin holding sub-unit and a pin-guiding sub-unit of a pin unit where moved towards each other and the plurality of pins are in an extended position.

FIGS. 2A and 2B show elements of a cell of a brush making machine comprising a pin unit 200A, a cleaning element holding plate 300A and a cleaning element receiving plate 400A. A cell as proposed may comprise further structural elements not shown. FIGS. 2A and 2B are cross-sectional cuts through the mentioned cell elements, where FIG. 2A shows the pin unit 200A in a first extreme state and FIG. 2B shows the pin unit 200A in a second extreme state.

The pin unit 200A comprises a pin holding sub-unit 210A, a pin guiding sub-unit 220A and a plurality of pins 100A. Each of the pins 100A has a first section 110A, a second section 120A, and a spring section 130A extending between the respective first and second sections 110A and 120A. The pin holding sub-section 210A and the pin guiding sub-section 220A are arranged for relative movement to each other along movement direction M. In some embodiments, the pin holding sub-unit 210A is moved towards and away from the pin guiding sub-unit 220A, which latter pin guiding sub-unit 220A may then be fixedly mounted in the cell.

In the shown embodiment, the pins 100A are held in a fixed position in the pin holding sub-unit by means of mechanical holding structures. These mechanical holding structures comprise here a half-cylindrical depression 111A in each of the first sections 110A and a cylindrical pin 1110A that fits into the depression 111A. The cylindrical pin 1110A may be fixedly mounted in the depression 111A or may just be positioned in the depression 111A by means of a positive fit. The cylindrical pins 1110A extends beyond the depressions 111A so that arms project at the sides of the pins 100A.

In the shown embodiment, the pin-holding sub-unit comprises a stack of three parallel plates 2101A, 2012A, and 2103A. A first plate 2101A is a bottom plate that comprises a plurality of channels 213A in which the first sections 110A of the pins 100A tightly fit. A second plate 2102A is a center plate that has cut-outs 212A that may be essentially T-shape so that the cylindrical pins 1110A fit in these cut-outs without much play so that the pins 1110A cannot slip out of the depressions 111A in case the cylindrical pins 1110A are not fixedly mounted in the depressions 111A. The height of the second plate 2102A may be chosen so that the cylindrical pins 1110A have essentially no play in longitudinal direction. A third plate 2103A serves as a top cover plate that has cutouts 211A into which the first ends 101A of the first sections 110A of the pins 100A extend. These cut-outs may be sized and shaped so that the first ends 101A fit loosely into these cut-outs 211A. The holding structures of the pins 100A formed by depressions 111A and cylindrical pins 1110A engage with the holding structure of the pin holding sub-unit 210A formed by the cut-outs 212A and by the top and bottom plates 2103A and 2101A and fix the pins 100A in longitudinal direction and also fix the pins in the angular position with respect to the longitudinal direction. The latter is important so that the bending directions of the pins 100A remain fixed and aligned. The channels 213A fix the inclination direction of the first sections 110A.

The second sections 120A of the pins 100A are extending in channels 221A of the pin-guiding sub-unit 220A. In the first extreme state shown in FIG. 2A, second ends 121A of the second sections 120A are essentially flush with the bottom surface of the pin guiding sub-unit 220A. This shall not exclude that in some other embodiments, the second ends 121A of the second sections 120A are somewhat retracted.

The cell 10A also comprises a cleaning element holding plate 300A having a plurality of channels 310A for holding cleaning elements therein, e.g. a plurality of filament tufts. The channels 310A are aligned in number, position and inclination with the channels 221A of the pin guiding sub-unit 220A. Hence, when the pin holding sub-unit 210A is moved towards the pin guiding sub-unit 220A, the second sections 120A of the pins 100A move through the channels 221A in the pin-guiding sub-unit 220A and into the aligned channels 310A of the cleaning element holding plate 300A. Any cleaning elements that may have been held in the channels 310A are then pushed outwards through the channels 310A by the moving pins 100A.

The cleaning element receiving plate 400A has channels 410A that are aligned in number and position of the opposing exit and entry openings with the channels 310A. The channels 410A may comprise a different cross-sectional shape than the channels 310A, e.g. at least one channel 410A may comprise a cross-sectional shape that is different to the cross-sectional shape of the respective aligned channel 310A. The channel 310A may have a circular cross-sectional shape and the aligned channel 410A may comprise a rectangular cross-sectional shape. This shall not exclude that the channel 410A has a transition interface that morphs the cross-sectional shape of channel 310A into the cross-sectional shape of channel 410A. Further, the channels 410A may comprise a different cross-sectional area than the channels 310A, e.g. at least one channel 410A may have a smaller cross-sectional area than the respectively aligned channel 310A. The latter may help to condense filament tufts from a somewhat loose tuft structure to a somewhat denser tuft structure.

The channels 410A do not need to have the same inclination as the channels 310A. As can be seen in FIG. 2B showing the second extreme state of the pin unit 200A, the second ends 121A of the pins 100A may then be essentially flush with the outer surface of the cleaning element holding plate 300A. As the pins 100A then do not enter the channels 410A of the cleaning element receiving plate 400A, the inclination of the channels 410A can deviate to some degree from the inclination of the respectively aligned channels 310A. The cleaning element receiving plate 400A may be arranged to be movable from the present cell 10A to another cell for further manufacturing steps.

Figure 3C:
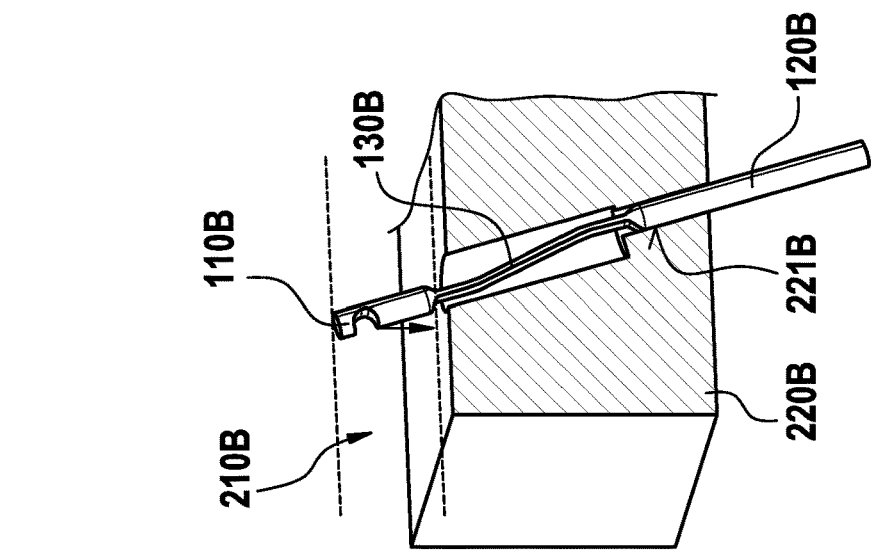
FIGS. 3A-3C show schematic depictions of a pin in a first extreme position in which the pin is bent into a first bending direction, an intermediate position in which the pin is unbent, and a second extreme position in which the pin is bent into a second bending direction.
Figure 3B:
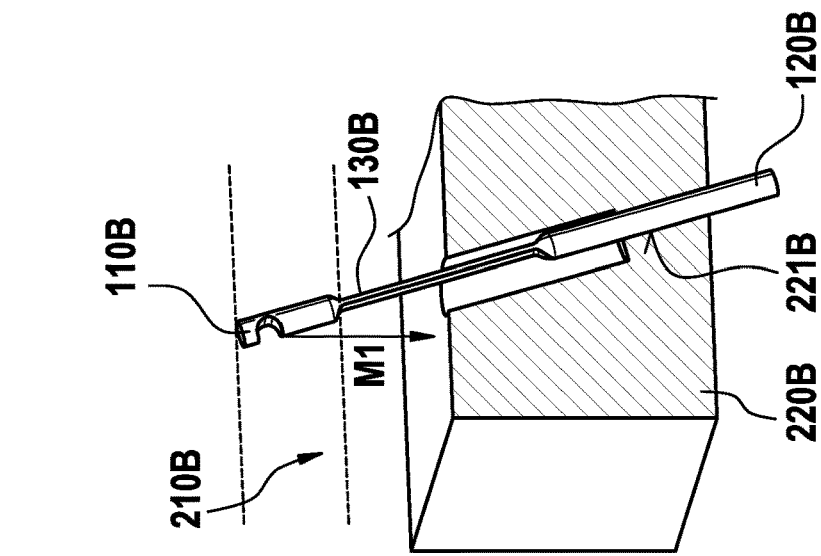
Figure 3A:
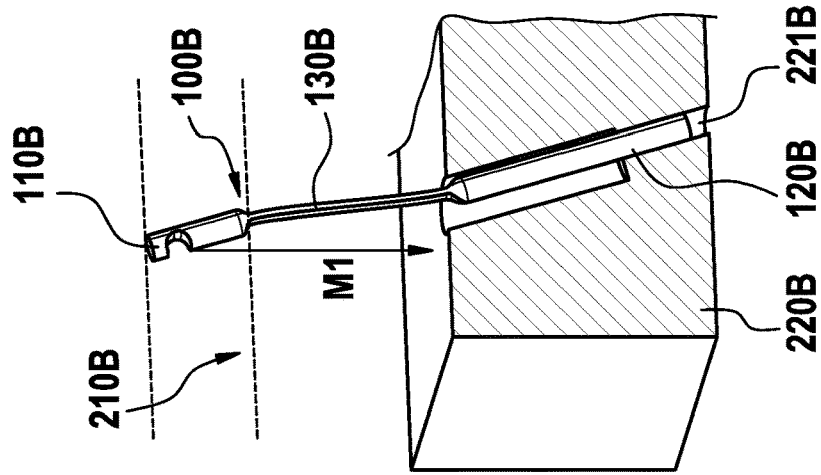

FIGS. 3A, 3B, and 3C schematically show a pin 100B that is guided in a channel 221B of a pin guiding sub-unit 220B. FIG. 3A shows a first extreme position in which the pin 100B is in its most retracted position in which it does not extend beyond the outer surface of the pin guiding sub-unit 220B and the spring section 130B of the pin 100B is bent into a first bending direction. FIG. 3B shows an intermediate position in which the pin 100B already extends beyond the outer surface of the pin guiding sub-unit 220B and the spring section is essentially straight, i.e. is unbent. The pin holding sub-unit 210B was moved towards the pin guiding subsection 220B along the movement direction M1. FIG. 3C shows a second extreme position in which the pin 100B is in its most extended position and the spring section 130B is bent into a second bending direction. It may be worthwhile to note that based on these figures it becomes clear that in case of a solid pin, the pin head (i.e. the first end of the pin) would need to move in the pin holding sub-unit when the pin holding sub-unit is moved towards and away from the pin guiding sub-unit. Due to the spring section 130B, the pin 100B in accordance with the present disclosure counteracts this relative movement by the bending of the spring section 130B and the first section 110B can be held in a positionally fixed position in the pin holding sub-unit 210B.

Figure 4:
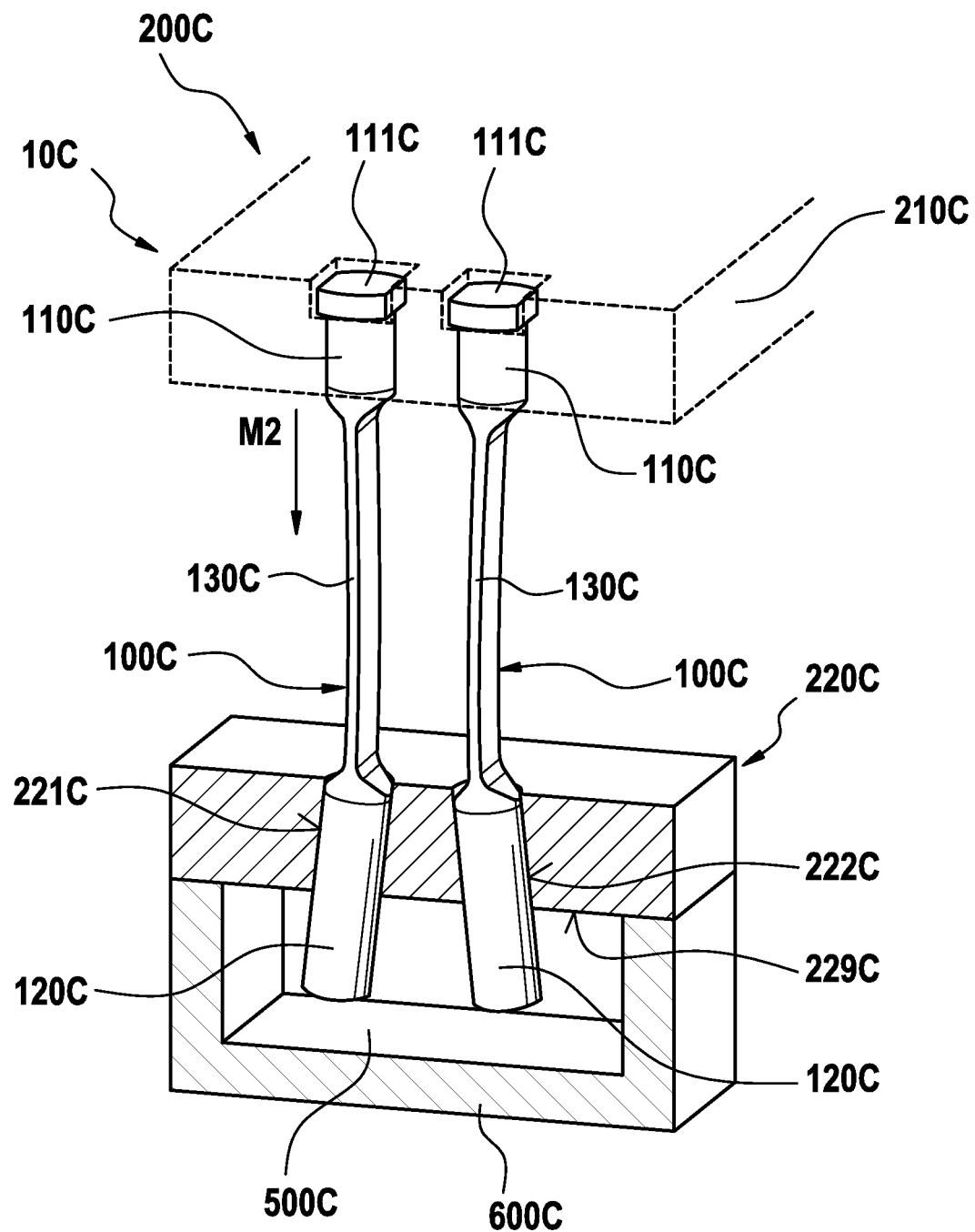
FIG. 4 is a schematic depiction of two pins that are each guided in channels in a pin guiding sub-unit, where the channels have different inclination.

FIG. 4 is a schematic depiction of some elements of a cell of a brush making device 10C. Two pins 100C of a pin unit 200C are shown that are held in a pin holding sub-unit 210C and are guided by a pin guiding sub-unit 220C. The pin holding sub-unit 210C was moved towards the pin guiding sub-unit 220C along movement direction M2. The pins 100C are thus shown in their extended position, where the second sections 120C of the pins 100C extend into a mold cavity 500C. The mold cavity 500C may be designed for molding a brush carrier having tufting holes. The second sections 120C of the pins 100C define the tufting holes. The second sections 120C are inclined with respect to a mounting surface of the brush carrier. The mold cavity surface 229C of the pin guiding sub-unit 220C defines the mounting surface of the brush carrier. The pin guiding sub-unit 220C has channels 221C and 222C that each guide one of the pins 100C. The channels 221C and 222C are differently inclined with respect to the movement direction M2. The first sections 110C of the pins 100C are held in the pin holding sub-unit 210C so that the longitudinal axes of the two pins are parallel with the movement direction M2, which shall not exclude that in other embodiments the first sections can be inclined. Pins without a spring section 130C would collide as the channels 221C and 222C are inclined to each other. It would be basically impossible to design a pin unit 200C as the one shown when the pins 100C are essentially rigid. But because of the spring sections 130C, the pins 100C balance out the different angulation of the second sections 120C with respect to the respective first sections 110C (which first sections 110C are both held straight and parallel to each other in the pin holding sub-unit 210C). This particular structure of the pins 100C allows designs of inclined tufts that are, e.g., inclined away from each other or that are inclined towards each other. As the first sections 110C are held in a fixed position in the pin holding sub-unit 110C, the design of brushes with inclined tufts gets rid of some limitations that come along with solid pins (e.g. potentially colliding pins). As it is not necessary to design a pin unit where the first ends of the pins are allowed to move in the pin holding sub-unit when the pin holding sub-unit is moved towards the pin guiding sub-unit, the overall design of the pin unit becomes easier and a higher flexibility of possible brush topologies results.

FIG. 5 is a schematic depiction of a brush making device 1 that comprises a cell 10 as discussed in the present disclosure, in which cell 10 a pin 100 is used as discussed in the present disclosure. In some embodiments, the brush making device 1 comprises only the cell 10, in other embodiments, the brush making device 1 comprises a plurality of cells that may be connected to form a manufacturing line and/or that may be arranged in parallel. It is contemplated that the brush making device 1 receives input material such as plastic material 21 and filaments 22 to manufacture and output brushes or brush parts such as replaceable brush heads 31 for electric manual toothbrushes or complete manual toothbrushes 32. The brush making device 1 may receive one plastic material 21 or various plastic materials 21 that may differ in color only or may be different materials such as polypropylene (PP), polyoxymethylene (POM) or polyamide (PA) or a thermoplastic elastomer (TPE). The brush making device 1 may output one brush type or may output a plurality of different brush types, e.g. differently colored versions. In some embodiments, the brush making device 1 may be arranged to switch from making one type of brushes to another type of brushes.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cell of a brush-making device for making at least a part of a toothbrush, comprising:
   a pin unit comprising at least one pin, a pin holding sub-unit, and a pin guiding sub-unit;
   the pin having a first section having a first end and a second section having a second end, the first section comprising a holding structure, and at least one spring section arranged between the first section and the second section;
   the pin holding sub-unit comprising a holding structure that is engaged with the holding structure of the pin for fixedly holding the pin, the pin holding sub-unit and the pin guiding sub-unit being arranged for being movable along a first direction towards and away from each other; and
   the pin guiding sub-unit having a channel for guiding at least a portion of the second section of the pin, the channel being inclined against the first direction,
   wherein the cross-sectional area and the cross-sectional shape of the pin in the spring section is essentially constant over the extension length of the spring section and the cross-sectional shape of the spring section is essentially rectangular, wherein a rectangle has a short side and a long side.

2. The cell in accordance with claim 1, wherein the pin unit comprises a plurality of pins each having a first section having a first end and a second section having a second end, each of the first sections comprising a holding structure, and each of the pins having at least one spring section extending between the first section and the second section of the pin, wherein the pin guiding sub-unit comprises a respective plurality of channels that each is arranged for guiding at least a portion of one of the second sections, in particular where at least two of the channels have an inclination with respect to the first direction that is different.

3. The cell in accordance with claim 1, wherein the pin has a retracted position and an extended position, wherein the second end extends beyond an outer surface of the pin guiding sub-unit in the extended position.

4. The cell in accordance with claim 3, further comprising a mold cavity for molding a brush part and wherein the second section of the pin extends into the mold cavity in its extended position to define a hole in the brush part to be molded in the mold cavity.

5. The cell in accordance with claim 3, further comprising a cleaning element holding plate having at least one channel for holding a cleaning element such as a filament tuft and wherein the second section of the pin is arranged to move at least partly into the channel of the cleaning element holding plate when the pin is moved from the retracted position into the extended position.

6. The cell in accordance with claim 1, wherein the cross-sectional area and cross-sectional shape of the pin in the second section is essentially constant, and wherein the cross-sectional shape of the pin in the second section is circular.

7. The cell in accordance with claim 1, wherein the first section of the pin is held by the pin holding sub-unit in a positionally fixed manner due to a mechanical engagement between the holding structure of the pin and the holding structure of the pin holding sub-unit.

8. The cell in accordance with claim 7, wherein the pin holding sub-unit comprises at least three stacked plates: a first plate comprising a channel through which a portion of the first section extends, a second plate comprising at least a portion of the holding structure of the pin holding sub-unit for holding the pin, and a third plate being realized as a cover plate so that the second plate is sandwiched between the first plate and the third plate.

9. The cell in accordance with claim 1, wherein the spring section of the pin is bent into a first bending direction in a first extreme position of the pin and bent into a second bending direction in a second extreme position of the pin so that the spring section is in an unbent stage at a position in between the two extreme positions, and wherein the unbent stage is achieved at about half the distance between the two extreme positions.

10. The cell in accordance with claim 1, wherein the pin is made from a spring steel.

11. The cell in accordance with claim 1, wherein the short side of the rectangle is at least a factor of 2 smaller than the long side of the rectangle.

12. The cell in accordance with claim 1, wherein the short side of the rectangle is at least a factor of 3 smaller than the long side of the rectangle.

13. The cell in accordance with claim 1, wherein the short side of the rectangle is at least a factor of 4 smaller than the long side of the rectangle.

14. A brush-making device having a cell in accordance with claim 1.

15. A pin for a cell of a brush-making device comprising a first section having a first end and a holding structure, a second section having a second end, and at least one spring section extending between the first section and the second section, the spring section having a cross-sectional area that is smaller than a cross-sectional area in the first section excluding the holding structure and having a cross-sectional area that is smaller than a cross-sectional area in the second section,
   wherein the cross-sectional area and cross-sectional shape of the spring section is essentially constant over the extension length of the spring section, wherein the cross-sectional shape of the spring section comprises a rectangular shape having a short side and a long side.

16. The pin in accordance with claim 15, wherein the cross-sectional area and the cross-sectional shape of the second section is essentially constant and in particular wherein the cross-sectional shape of the pin in the second section is circular.

17. The pin in accordance with claim 15, wherein the short side of the rectangle is at least a factor of 3 smaller than a long side thereof.

18. The pin in accordance with claim 15, wherein the short side of the rectangle is at least a factor of 4 smaller than a long side thereof.

19. The pin in accordance with claim 15, wherein a short side of the rectangle is at least a factor of 2 smaller than a long side thereof.

* * * * *